Feb. 10, 1959  Q. C. JOHNSON  2,873,138
MANUAL AND AUTOMATIC LATCH MECHANISM
Filed Jan. 17, 1957  3 Sheets-Sheet 1

INVENTOR.
QUINTON C. JOHNSON
BY
ATTORNEYS

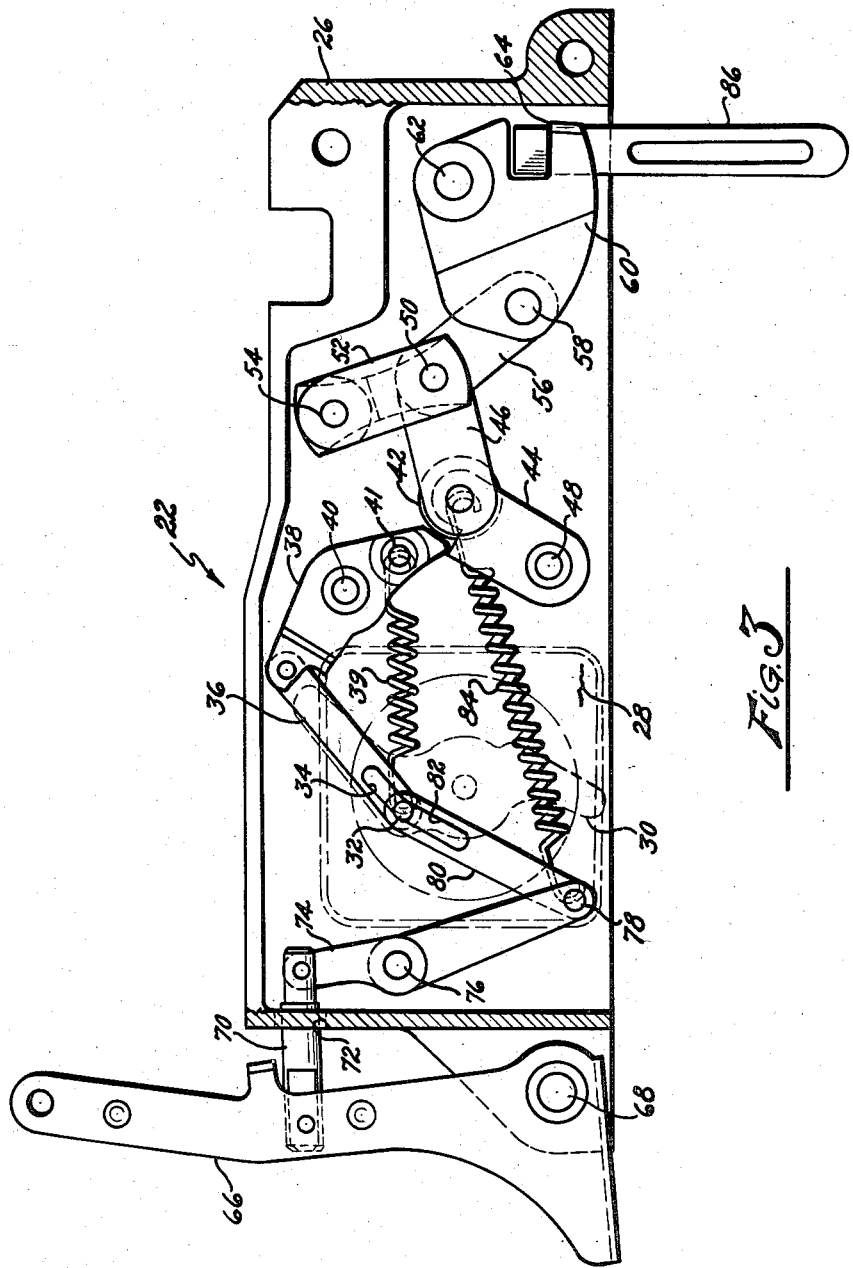

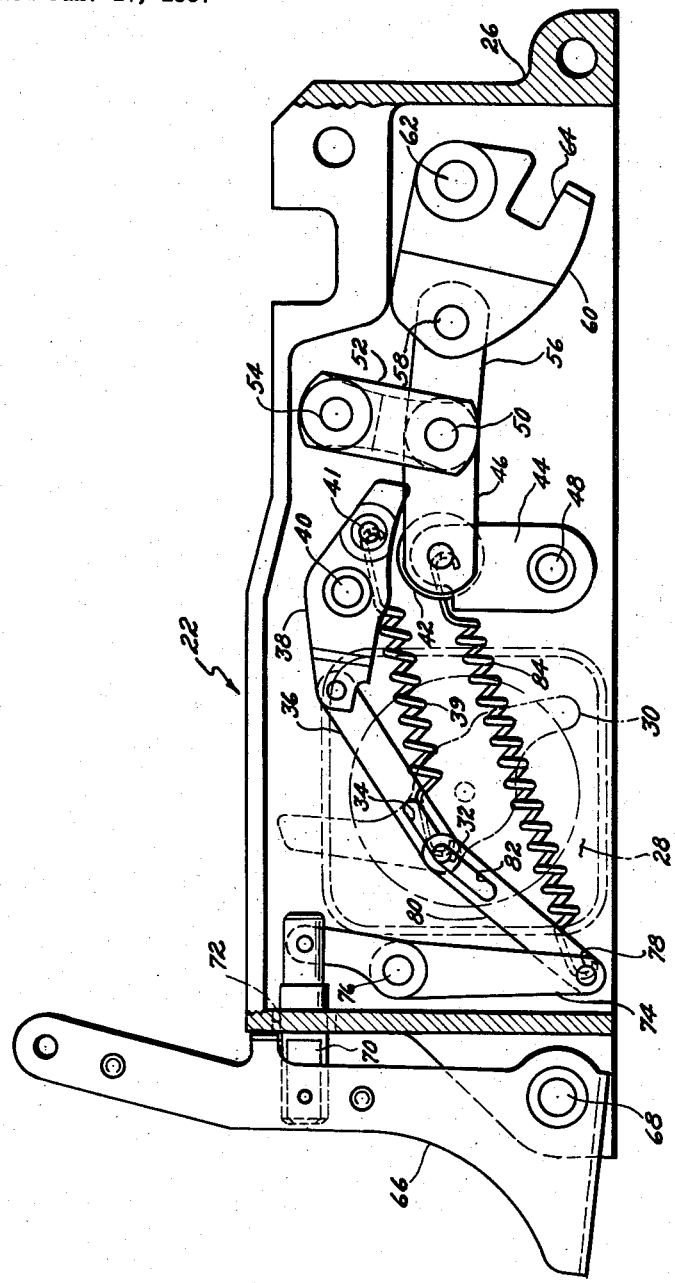

2,873,138

MANUAL AND AUTOMATIC LATCH MECHANISM

Quinton C. Johnson, Torrance, Calif., assignor to the United States of America as represented by the Secretary of the Air Force Application January 17, 1957, Serial No. 634,802

4 Claims. (Cl. 294—83)

This invention relates to a releasable latch mechanism, and is more particularly concerned with such a mechanism adapted for releasing objects from an aircraft.

Due to the development of high speed aircraft, particularly those of the jet powered type requiring large quantities of fuel, a need has been created for providing auxiliary fuel storage means which may be carried by the aircraft until the supply of fuel therein is exhausted, and which may then be jettisoned to reduce the drag and the over-all aircraft weight and facilitate return to the home base. Although my invention will be described as utilized in conjunction with the suspension mechanism of disposable fuel tanks on aircraft, it is not intended that the use of the invention be limited to any particular object since it will be apparent that various other types of objects, such as bombs or food or weapon containers, could be jettisoned by an aircraft equipped with my invention. Further, it will also be seen that my latch mechanism may be employed in many places besides aircraft.

It is a primary object of my invention to provide an improved latch mechanism which may be operated either electrically or manually.

Another object of my invention is to provide a compact latch mechanism which is both simple and inexpensive to construct.

Another object of the invention is to provide such a mechanism in which release may be accomplished by exertion of a minimum force through a linkage which serves as a multiplier of such force.

The above and still further objects of the invention will become apparent upon consideration of the following detailed description thereof, especially when taken in conjunction with the accompanying drawings, in which:

Figure 3 is a side elevation of the mechanism in latched position, the cover plate having been removed; and Figure 4 is a view similar to Figure 3 but showing the mechanism in released position.

Figure 1:
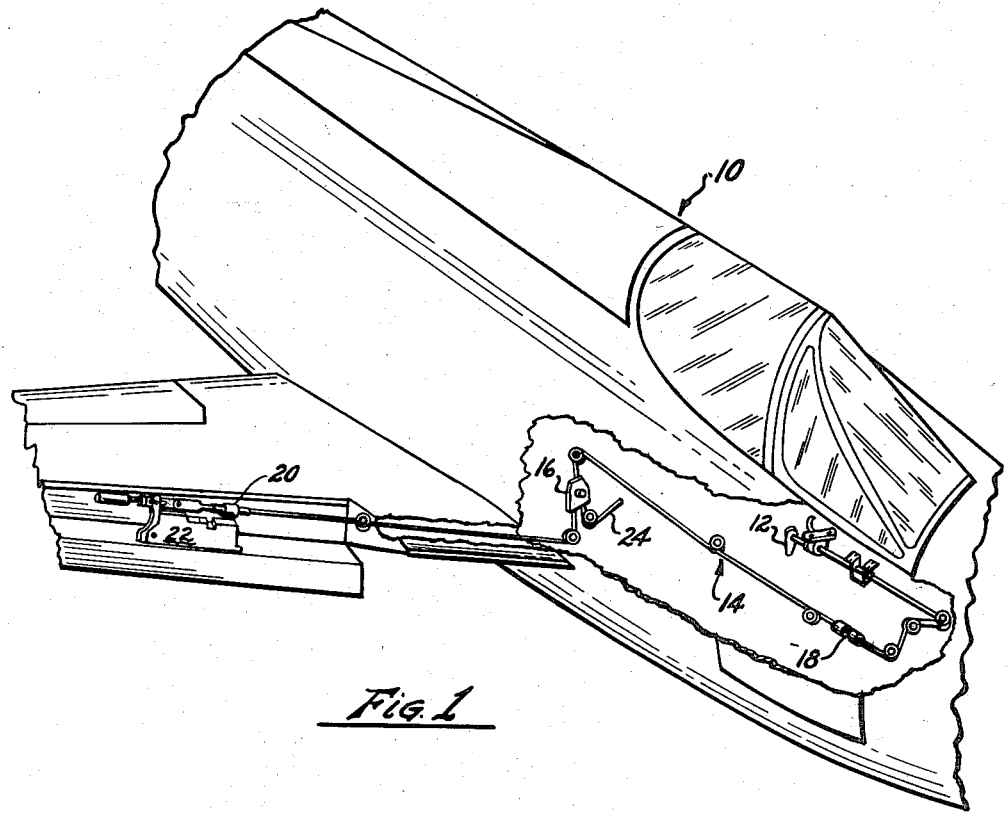
Figure 1 is a pictorial view of my invention as it would be mounted in the wing of an aircraft.

Turning now to the drawings in which like characters of reference indicate like parts, an aircraft which might carry a releasable object is shown generally at 10. A handle 12 is mounted in the cockpit, and a belt and pulley system 14 connects said handle to a divider 16. The system 14 includes a quick-disconnect coupling 18. From the divider, a pair of secondary systems extend outwardly, one to each wing. Secondary system 20 goes to the leading edge of the right wing where it is attached to a release unit 22, while secondary system 24 goes to a similar unit in the left wing (not shown). When the pilot pulls handle 12, the release units are simultaneously operated in a manner hereinafter described.

Turning to Figures 3 and 4, the release unit 22 comprises a housing 26. An electric motor assembly 28 is mounted within the housing. Said assembly may be of any conventional type wherein the rotor moves a predetermined distance in one direction upon energization, and then reverses direction and returns to its starting point upon de-energization. An operating arm 30 is mounted on said rotor for rotation therewith. The operating arm carries a pin 32 thereon, said pin extending outwardly from said arm and through a slot 34 in one end of a link 36. The other end of said link 36 is connected to one end of a detent 38 which is centrally pivoted at 40. A tension spring 39 reacts between a pin 41 on the detent 38 and the pin 32 on the operating arm. As best seen in Figure 3, the opposite end of said detent engages a roller 42. A pair of links 44 and 46 form a first toggle device, and said roller serves as a floating pivot for the device.

At its outer end the toggle link 44 is pivoted on the fixed pin 48. The outer end of toggle link 46 is attached to a pin 50, and said pin also serves as the floating central pivot for a second toggle device.

One link 52 of the second toggle device is mounted on a fixed pivot 54, while the other link 56 of said device is connected to a movable pivot 58. A latch member 60 rotates about a fixed pivot 62, and said latch is also connected to the movable pivot 58 for operation by the link 56. A slot 64 is formed in said latch to hold the member to be latched. An inner surface of the housing 26 acts as a stop for the latch 60 when the latter moves to released position (Figure 4).

The structure for manually operating the release mechanism is shown at the left-hand sides of Figures 3 and 4. Such structure comprises a crank 66 having its lower end pivoted at 68 to the unit housing 26. The other end of said crank extends above said housing and is connected to one of the secondary systems for operation thereby. A link 70 has one end pivoted on the crank 66, and extends through an aperture 72 in the housing. Inside said housing its other end is pinned to one end of a bellcrank arrangement 74. The latter is pivoted between its ends at 76, and its other end has a floating pivotal connection at 78 to a latching arm 80. A slot 82 in said arm 80 rides on the pin 32, and a second tension spring 84 is connected between said floating pivot 78 and the roller 42.

Figure 2:
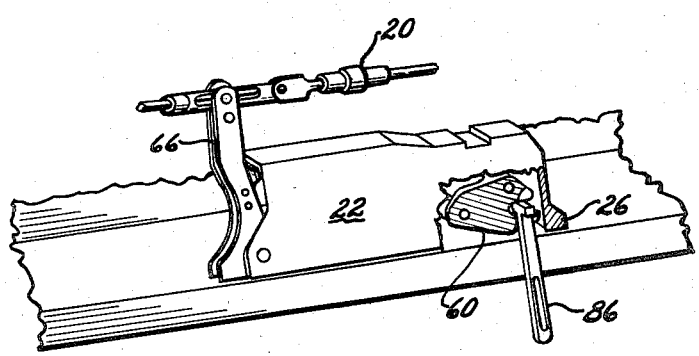
Figure 2 is a pictorial view of the release mechanism showing the manual operating connector and the member to be released.

With the parts in the position shown in Figure 3, a member to be held in place is attached to the latch mechanism. Such member usually includes an appertured link, such as 86 in Figure 2, which extends through an opening in the unit housing and hooks onto the slot 64 in the latching arm 60. The release mechanism is actuated by operation of a switch (not shown) which is easily accessible to the pilot. Said switch closes a circuit for the electric motor assembly 28 and causes counterclockwise rotation thereof. Since the operating arm 30 rotates with said assembly, the pin 32 thereon moves freely until it contacts the lower edge of the slot 34. Thereafter the continued movement of said pin results in downward movement of the link 36. This in turn rotates the detent 38 about its pivot against the tension of the spring 39 to free the roller 42.

With the restraining action of the detent removed, the tension spring 84 acts through said roller to pivot the toggle linkage 44—46 around fixed pivot 48. The connection at pivot 50 causes a similar action of the toggle linkage 52—56 about its fixed pivot 54. Finally, link 56 rotates the latch 60 in a clockwise direction, and the slot 64 moves away from its horizontal latching position. The apertured link 86 is permitted to slide from said slot, and the wing tank or other releasable object attached to said link is free to fall from the aircraft.

If, upon actuation of the switch, it is found that electrical system is faulty, the pilot can accomplish release by pulling handle 12. The force applied to said handle is transmitted through the belts and rotates the crank 66 clockwise about the pivot 68. This moves link 70 further into the housing and causes clockwise rotation of the bellcrank arrangement 74. The latter, through its floating pivot 78 and the latching arm 80, rotates the pin 32 in the same manner as if the electric motor assembly had been energized. Release of the roller 42 and rotation of the slot 64 follow in the same manner as heretofore described.

Thus it can be seen that my invention provides an improved means for the release of objects from aircraft. By the use of a series of toggle linkages a mechanical advantage is obtained which permits the amount of applied force to be greatly reduced, while the manually operable mechanism insures against failure due to damage or to failure of the electrical system of the aircraft.

It is to be understood that the above-described arrangements are merely illustrative of the applications of the principles of my invention. Numerous other arrangements may be devised by those skilled in the art without departing from the spirit and scope of the invention.

What is claimed is:

1. A holding mechanism for releasing objects temporarily attached to aircraft comprising a latch member mounted for rotation about a fixed pivot, said latch member being movable between a holding position and a releasing position, a first pair of links, one end of each of said pair being connected by a floating pivot, the opposite end of one link having a fixed pivot and the opposite end of the other link having a pivotal connection to said latch member, a second pair of links, an end of each of said second pair being connected by a floating pivot, the other end of one of said second pair having a fixed pivot while the opposite end of the other link of said second pair is connected to the floating pivot of said first pair, a roller forming part of the floating pivot of said second pair, biasing means acting on said roller and through both pairs of links to urge said latch member to its releasing position, a centrally pivoted detent engaging said roller and holding the latter against said biasing means, and electromagnetic means pivoted to one end of said detent for disengaging said detent from said roller.

2. A mechanism as defined in claim 1 wherein said electromagnetic means comprises an operating arm one end of which has said pivoted connection to said detent, the opposite side of arm having a longitudinal slot therein, a rotor having a pin mounted thereon for rotation therewith, said pin being positioned in the slot in said arm.

3. A mechanism as defined in claim 2 and further including a manual actuator for said latch member, said actuator comprising a second arm having a longitudinal slot in one end thereof, said latter slot being positioned on said pin, and linkage means connecting the other end of said second arm to a crank located externally of said housing.

4. A mechanism as defined in claim 3 wherein said last-named means includes a floating pivot at said other end of said second arm, and biasing means acting between said last-named pivot and the floating pivot of said second pair of links.

References Cited in the file of this patent

UNITED STATES PATENTS

| | | |
|---|---|---|
| 2,756,091 | Komerska | July 24, 1956 |
| 2,758,867 | Elsner | Aug. 14, 1956 |
| 2,809,557 | Johnson | Oct. 15, 1957 |